United States Patent [19]

Walter

[11] 3,977,845

[45] Aug. 31, 1976

[54] ADSORPTIVE PROCESS FOR SELECTIVE SEPARATION OF GASES

[76] Inventor: William Clarence Walter, 2 Westway, Rochester, N.Y. 14624

[22] Filed: June 20, 1975

[21] Appl. No.: 588,707

[52] U.S. Cl. .................................. 55/25; 55/68; 55/73
[51] Int. Cl.² ................................ B01D 53/04
[58] Field of Search ............... 55/33, 62, 75, 74, 68, 55/73, 25

[56] References Cited
UNITED STATES PATENTS

| 3,142,547 | 7/1964 | Marsh et al. ...................... 55/62 X |
| 3,405,507 | 10/1968 | Spencer et al. ...................... 55/62 |
| 3,712,027 | 1/1973 | Hasz ...................................... 55/62 X |
| 3,738,087 | 6/1973 | McCombs ............................. 55/62 X |
| 3,788,036 | 1/1974 | Lee et al. ............................... 55/62 X |
| 3,797,201 | 3/1974 | Tamura ...................................... 55/62 |
| 3,893,827 | 7/1975 | Leppard ................................. 55/62 X |

Primary Examiner—Thomas G. Wyse
Assistant Examiner—Robert H. Spitzer

[57] ABSTRACT

Gas mixtures are separated in selective adsorbent beds to produce a product stream of gas in a process utilizing a segregated storage tank containing selective adsorbent material to depressurize and repressurize the selective adsorbent beds as required. This process conserves valuable product gases ordinarily diverted to a waste stream and permits continuous, uninterrupted delivery of product.

12 Claims, 5 Drawing Figures

ADSORPTIVE PROCESS FOR SELECTIVE SEPARATION OF GASES

BACKGROUND OF THE INVENTION

This invention relates to improvements in the separation of gas mixtures, and more particularly to a process for the separation of gas mixtures by selective adsorption.

Gas mixtures having selectively adsorbable components can be separated by certain adsorbent materials, and this technique for the separation of gases is generally known as the pressure swing separation of gases. Commercially available adsorbent materials with selective adsorption characteristics are well known for these processes. Each adsorbent has unique characteristics which adapt its use to various gas separation systems. The various applications for such systems range from the separation of complex organic and/or inorganic gas mixtures to the purification of air by the removal of water and carbon dioxide. The prior art is replete with examples of these mixtures of gases which can be separated by the pressure swing processes. For example, ethane, propane, ethylene or propylene can be separated from each other or from higher gaseous paraffins or olefins; sulfur oxides, hydrogen sulfide, carbon dioxide, carbon disulfide and/or carbonyl sulfide can be removed from natural gas, ethane, propane, butane, ethylene, propylene, isoprene or butadiene; and carbon dioxide and/or nitrogen can be separated from air so as to purify the air or provide an oxygen enriched air. Although the present process is specifically described and illustrated in relation to the application of pressure swing adsorption to the fractionation of air as a means of producing an oxygen rich stream, it is broadly applicable to the separation of organic and/or inorganic gas mixtures.

There have been many pressure swing adsorption systems set forth as a means of separating air into basically an oxygen rich stream and a nitrogen rich stream. The oxygen rich stream is of greatest commercial interest due to its many and varied uses. The main goal of these systems has been to conserve oxygen and thereby obtain the highest possible oxygen recovery from the feed air stream. This has been accomplished by utilizing one or more adsorbent beds and on occasion, one or more empty storage tanks connected and sequentially arranged such that a minimum low purity oxygen stream is vented to the atmosphere while a maximum of high purity oxygen is available as a product oxygen stream.

One of the pressure swing adsorption systems is described by Marsh et al in U.S. Pat. No. 3,142,547. Marsh et al provide a cyclic scheme of alternately diverting lower pressure product oxygen from either one of two adsorbent beds for storage in an empty tank for later use as a countercurrent purge gas for the low pressure desorbing bed. This involves the preparative repressurization of the non-adsorbing bed with product oxygen from the adsorbing bed prior to switching the feed stream to the purged repressurized bed. However, it is limited in quantity of void gas recovery to that which can be blown down before pressure equalization occurs between the adsorption bed and the surge tank. Moreover, it diverts a low purity oxygen stream to the atmosphere and delivers product quality oxygen only after the maximum adsorption pressure has been reached.

U.S. Pat. No. 3,738,087 to McCombs et al describes several cycles wherein repressurization occurs partially with feed gas after initial bed pressure equalization step(s). Product quality oxygen is removed from the bed being repressurized with feed air in McCombs et al, this being referred to as variable pressure adsorption.

In U.S. Pat. No. 3,788,036, Lee et al describes a sequential pressure equalization technique where high pressure in the adsorbent bed which is to commence a regeneration phase is conserved by a dual pressure equalization. Lee et al conserve oxygen to a greater extent than McCombs and Marsh et al by adding an empty tank to the system and using this tank to supply the purge gas to the depressurized desorbing bed and showed significantly improved performance over Marsh et al and McCombs, but Lee et al cannot deliver continuous product oxygen without adding a product surge tank, nor can Lee et al continuously receive an uninterrupted flow of feed air.

Other pressure swing adsorption processes are also described in the prior art. However, these systems also have the same shortcomings as described supra and/or require four or more adsorbent beds with concomitant piping and valving to provide efficient separation of gases, uninterrupted flow of product gas and/or continuous flow of feed air stream.

OBJECTS OF THE INVENTION

Accordingly, it is the primary object of this invention to provide an improved process for separation and fractionation of gas mixtures of selective adsorption.

It is another object of this invention to provide an improved process for conserving low purity product gases heretofore vented from swing adsorption process systems.

It is another object of this invention to provide for the efficient separation of gases by a selective adsorption process utilizing as few as two adsorbent beds directly exposed to a feed gas stream.

Another object of this invention is to provide a continuous, uninterrupted flow of product gas from adsorbent beds which have selectively separated gases in a continously flowing feed gas stream while utilizing low purity product gases for repressurization of regenerated adsorbent beds and high purity product quality gas for purge gas to regenerate adsorbent beds without sacrificing the integrity and quality of the product gas.

Still another object of this invention is to provide an improved process for separation of air by selective adsorption to provide a product oxygen of desired purity without loss of low purity oxygen normally vented as a waste gas.

Another object of this invention is to provide a process for regenerating exhausted adsorbent beds and repressurizing such regenerated beds with high quality non-product oxygen and low purity oxygen fractions respectively, said oxygen generally being diverted to other functions of lesser importance or diverted to waste.

These and other objects and advantages will be apparent from the ensuing disclosure and appended claims.

SUMMARY OF THE INVENTION

These and other objects of this invention are accomplished by utilizing at least two adsorption beds and at least one segregated storage tank having adsorbent material therein and hereinafter referred to as the segregated storage adsorption bed. It is critical in the processes of the present invention that the segregated storage adsorption bed never be exposed directly to the feed gas stream during fractionation cycles.

The segregated storage adsorption bed allows for the withdrawal of high quality or high purity product gas therefrom for product and/or purge gas from its one end, and low purity gas which is not of product quality, can be withdrawn from the other end to be used to aid in the feed end representation of the adsorbent bed or beds to be used later as the adsorbing bed. Low purity gas which is not of product quality, is diverted from the particular bed which has just terminated adsorption, without contaminating the product delivering end of the next adsorbing bed. This low purity gas is used to replace the high purity product gas in the upper portions of beds undergoing depressurization in the particular vessel or tank head and in associated piping resulting in lower product gas losses during the subsequent countercurrent depressurization to atmosphere and purge and a higher product gas recovery.

The lower product gas loss and high product gas recovery is accomplished by passing the low purity product gas from the adsorption bed to one end of the segregated storage adsorption bed where it is adsorbed and later discharged therefrom to aid in the feed end repressurization of the next adsorbing bed. By using the low purity product gas stream to repressurize at the feed end, there is only a minimal effect (loss of adsorptive capacity) on the fractionation or separation capacity of the adsorbing bed.

As used herein, low purity product gas refers to gas which has passed through an adsorption bed in the final stages of adsorption and having only minimal adsorptive capacity whereby the gas has been fractionated to such an extent tha it is of higher purity or quality than the feed gas stream (gaseous mixture to be fractionated).

In accordance with the present invention any gas mixture may be separated by the proper selection of time, pressure and adsorbent material.

As used herein, depressurizing or depressurization refers to the reduction of pressure in a vessel and associated piping and includes the complete removal of pressure from vessels during certain steps. In accordance with the present invention desorption and purging pressures may be subatmospheric and may be manipulated by one skilled in the art. Pressurizing or pressurization refers to the increase of pressure in a vessel and associated piping. The various embodiments of the present invention include product gas delivery at pressures less than about 2 p.s.i.g. and up to about 40 p.s.i.g., however, the present invention is not meant to be limited to the pressures of the delivery gas or any other pressures, it being within the purview of one skilled in the art to manipulate and adjust pressures throughout the system to provide the desired delivery or product gas pressure.

In general, the present invention is described and exemplified in terms of a process utilizing a first adsorption bed, a second adsorption bed and a segregated storage adsorption bed. However, the process of the invention may be carried out in a system having more than one first adsorption bed, more than one second adsorption bed and more than one segregated storage adsorption bed. The only limiting factor is the utilization of at least one segregated storage adsorption bed which is never directly exposed to the feed gas stream, which allows for the withdrawal of product quality gas from its one end, and which allows for the withdrawal of low purity product gas from its other end.

As used herein "adsorption bed", "adsorption beds", "first adsorption bed", "second adsorption bed", and "at least one additional adsorption bed" refer to an adsorption bed communicating with a feed gas stream or feed gaseous mixture stream as opposed to "segregated storage adsorption bed" or "segregated adsorption bed" which refers to an adsorption bed which never directly communicates with a feed gas stream or feed gaseous mixture streams.

DESCRIPTION OF THE PREFERRED EMBODIMENTS

Although the preferred embodiments of this invention are illustrated by systems which separate or fractionate air to provide a high purity product oxygen by the removal of nitrogen, essentially any gas mixture may be separated in accordance with the present invention by the proper selection of time for each cycle or step and pressure for each cycle or step and by the selection of a proper adsorbent material, adsorbent materials or mixtures of adsorbent materials.

Adsorbent materials are well known in the art, and one skilled in the art may select an adsorbent material(s) which is commercially recommended for the separation or fractionation of the particular gas to be purified. Examples of typical adsorbent materials for use in adsorption beds include natural or synthetic zeolites, silica gel, alumina and the like. Generally, the adsorbent beds and segregated storage adsorbent bed in the same system contain the same adsorbent material, however, each bed may contain a different type of adsorbent material or different mixtures of adsorbent materials as desired. The particular adsorbent material or mixtures used are not critical in the practice of the present invention as long as they separate or fractionate the desired components.

In general, the process of the present invention for continuously fractionating at least one component from a gaseous mixture by selective adsorption in each of at least two adsorption beds or zones is carried out by providing a first adsorption bed having a gas inlet and a gas outlet, a second adsorption bed having a gas inlet and a gas outlet, the gas inlets of said first and second adsorption beds being connected to a feed gas stream, at least one segregated storage adsorption bed having two inlet-outlet pipes, the first inlet-outlet communicating wih the gas inlets and gas outlets of said first and second adsorption beds and the second inlet-outlet communicating with the gas outlets of said first and second adsorption beds and a product outlet, the product outlet also communicating with the outlet of the first and second adsorption beds, a waste outlet communicating with either the inlet or both the inlet and outlet of said first and second adsorption beds, and associated valves to isolate each of said elements. In accordance with the present invention, there may be multiples of each of the described elements, and there may be multiples of the complete system connected in series as desired.

In a preferred embodiment for delivery of a product gas at high pressures, there is provided a first adsorption bed having a gas inlet and a gas outlet, a second adsorption bed having a gas inlet and a gas outlet, the gas inlets of said first and second adsorption beds being connected to a feed gas stream, at least one segregated storage adsorption bed having two inlet-outlet pipes, the first inlet-outlet communicating with the gas inlets and gas outlets of said first and second adsorption beds and the second inlet-outlet communicating with the gas outlets of said first and second adsorption beds and a product outlet, the product outlet also communicating with the outlet of the first and second adsorption beds, a waste outlet communicating with the inlet of said first and second adsorption beds, and associated valves to isolate each of said elements. The process of this embodiment may be referred to as an isobaric adsorption step with product gas available at or near the adsorption pressure. This is the embodiment illustrated in FIGS. 1 and 2, and in accordance with the description found in FIG. 2 the product gas is approximately 40 pounds per square inch gage. This particular embodiment as applied to air separation with its elevated pressure product delivery is ideally suited for use in gas cutting or welding equipment. The process utilizing this embodiment is described in more detail infra in relationships to FIGS. 1 and 2.

In another preferred embodiment for delivery of a product gas, such as oxygen, at low pressures, there is provided a first adsorption bed having a gas inlet and a gas outlet, a second adsorption bed having a gas inlet and a gas outlet, the gas inlets of said first and second adsorption beds being connected to a feed gas stream, at least one segregated storage adsorption bed having two inlet-outlet pipes, the first inlet-outlet communicating with the gas inlets and gas outlets of said first and second adsorption beds and the second inlet-outlet communicating with the gas outlets of said first and second adsorption beds and a product outlet, the product outlet also communicating with the outlet of the first and second adsorption beds, a waste outlet communicating with the inlet and outlet of said first and second adsorption beds, and associated valves to isolate each of said elements. The process of this embodiment allows the continual removal of product oxygen at low pressures from the uncontaminated end, that is, the second inlet-outlet end, of the segregated storage adsorption bed for discharge at the product outlet. This is the embodiment illustrated in FIGS. 3 and 4, and in accordance with the description found in FIG. 4 the product gas has an approximate pressure of less than about 2 pounds per square inch gage. This particular embodiment as applied to air fractionation with its low pressure product delivery is capable of a high performance level and is sufficient, for example, for such applications as breathing devices. The process utilizing this embodiment is described in more detail infra in relationship to the description of FIGS. 3 and 4.

The storage bed is referred to as having "inlet-outlet pipes" for ease of description and to distinguish the flow of gases into and out of the segregated storage adsorption bed from the flow of gases into and out of the adsorption bed connected directly to the feed air streams.

Figure 1:
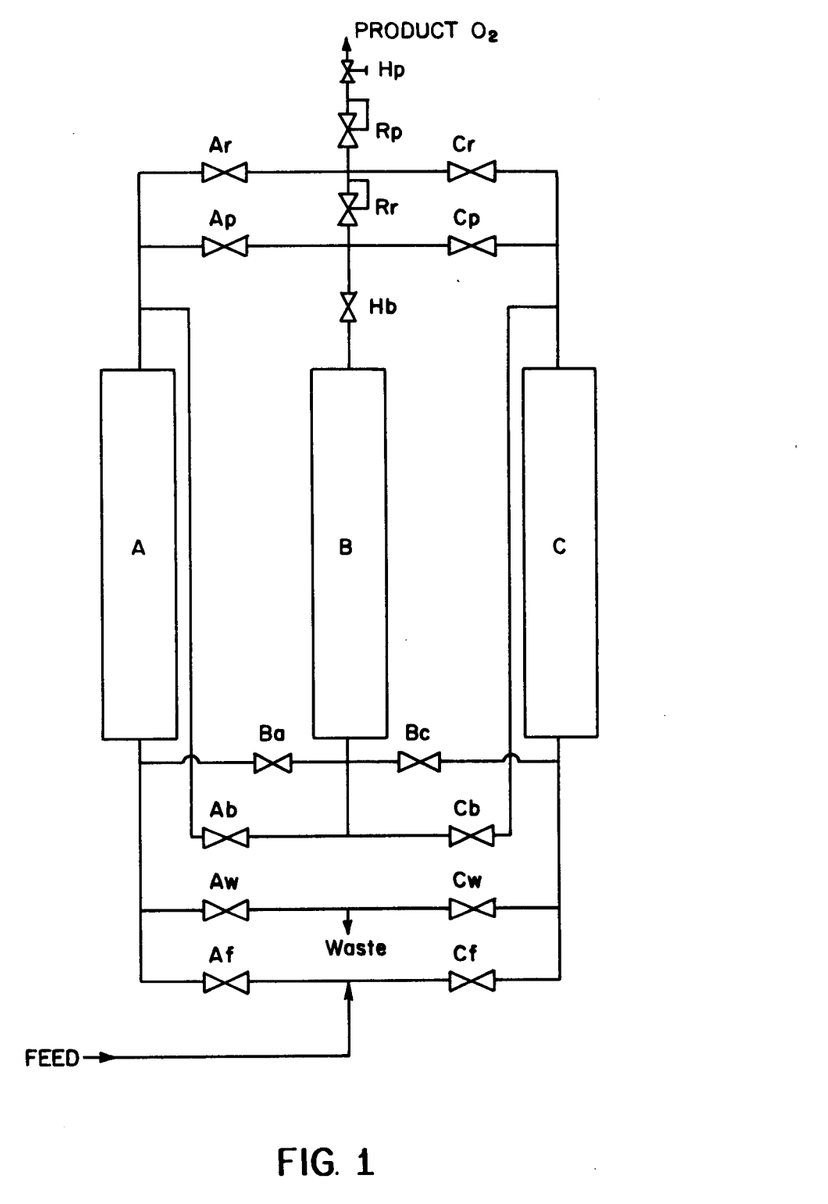
FIG. 1 is a schematic diagram of a high pressure product delivery embodiment.
Figure 2:
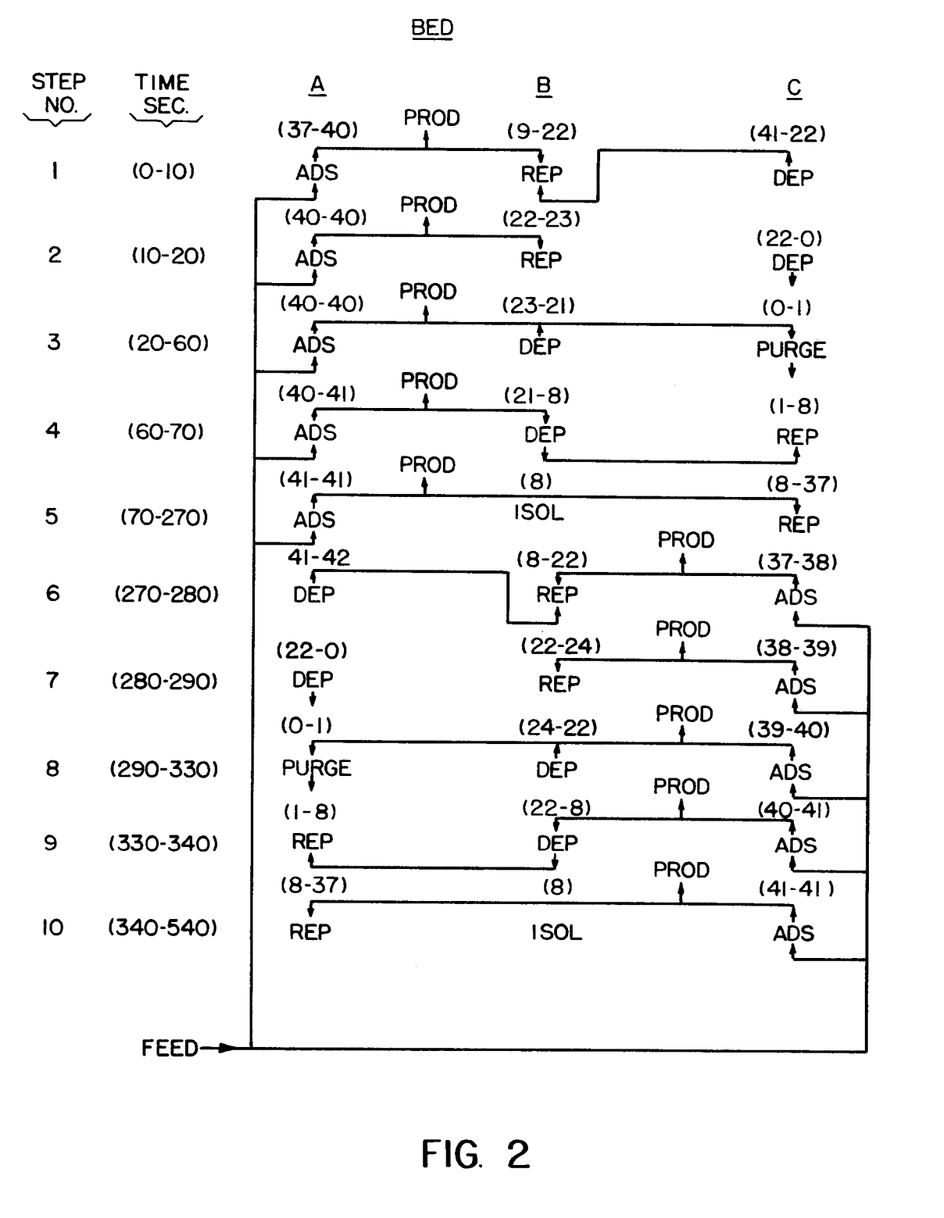
FIG. 2 is a cycle sequence chart for a high pressure product delivery embodiment.

Referring to FIGS. 1 and 2, a specific high pressure product delivery embodiment and cycle will now be described. In FIG. 1, A and C represent vessels containing adsorbent materials and described generally as adsorbent beds or zones. Both A and C communicate with the feed gas stream designated in the drawing as "FEED". As used herein, "A" defines a first adsorbent bed and "C" defines a second adsorbent bed or at least one additional adsorbent bed. "B" represents a vessel containing adsorbent material and is described generally as the segregated storage adsorbent bed. "B" does not communicate with the feed gas stream. Preferred vessel construction of the adsorbent beds and segregated storage adsorbent bed is an outer pressure shell with an inner annulus. One skilled in the art can provide suitable pressure vessels, piping or tubing, connectors, valves and auxillary devices and elements.

The following steps describe the high pressure product delivery process in detail. Preferred times (in seconds) for operation of each step, preferred pressures in each vessel (shown parenthetically) for each step, and the particular operation being carried out in each vessel during each step are all shown in FIG. 2.

In all figures, "ADS" refers to adsorbing or adsorption, "DEP" refers to depressurizing or depressurization, "PURGE" refers to the introduction of purge gas or purging, "REP" refers to repressurization or repressurizing to increase the pressure in the vessel, "ISOL" refers to isolating or isolation of the vessel from other vessels and systems, and "PROD" refers to product gas, for example, oxygen. "WASTE" in the drawings refers to the waste outlet for discharging unwanted and/or undesirable gases to the atmosphere or to a proper trap or scrubbing device.

Unless otherwise described in reference to particular drawings and embodiments, generally, the inlets of vessels A and C are at the feed stream end of the vessel and the outlets are at the opposite end thereof. The first inlet-outlet of vessel B is the end which communicates with both the inlets and outlets of vessels A and C and the second inlet-outlet of vessel B is the end which communicates with the outlets of vessels A and C and also with the product outlet.

PROCESS STEPS FOR HIGH PRESSURE PRODUCT DELIVERY EMBODIMENT OF FIGS. 1 AND 2:

Step No. 1 Valve Af opens allowing nitrogen rich gas, (air) to enter adsorbing bed A. Valve Ar opens allowing oxygen rich gas to be taken as product through pressure regulator Rp and throttle valve Hp. Regulator Rr opens allowing product quality oxygen rich gas to enter the top of bed B, (the segregated storage tank) through valve Hb. Valve Cb opens allowing nitrogen rich gas to flow into the bottom of bed B. In this step air separation has been initiated in bed A. Bed B is conserving product quality oxygen by storage in its clean top end. Bed C is partially depressurized into the bottom end of bed B. Nitrogen rich gas (low purity product) flows out of the top of bed C and into the bottom end of bed B, flushing the interconnecting vessel head and piping of oxygen rich gas and storing it in bed B. Throughout this step and all other steps there is continuous air flow into the system and continuous product flow out.

The process of step 1 may be described as simultaneously introducing the gaseous mixture into the gas inlet of the first adsorption bed from the feed gas stream, allowing the gaseous mixture to pass through the first adsorption bed, releasing product gas from the outlet of the first adsorption bed, and discharging the product gas from the product outlet; and simultaneously therewith collecting product gas in the segregated storage adsorption bed through the second inlet-outlet pipe thereof while partially depressurizing the second adsorption bed from the outlet thereof into the first inlet-outlet pipe of the segregated storage adsorption bed, until the gas flowing from the second adsorption bed into the segregated storage adsorption bed is depleted of any product value.

Step No. 2 Valve Af remains open allowing feed air to enter bed A. Valve Ar remains open allowing product quality oxygen rich gas to be taken as product through regulator Rp and throttle valve Hp. Product quality oxygen rich gas continues to flow through back pressure regulator Rr through valve Hb and into the top end of bed B. Valve Cb has now closed. Valve Cw opens, allowing nitrogen rich gas (waste gas) to be rejected to the atmosphere. In this step bed A remains on adsorption, separating feed air. Product quality oxygen rich gas is withdrawn as product. Additional product quality oxygen rich gas is stored in the top end of B. Bed C has been depressurized to the atmosphere in a direction reverse to air separation in the first step of waste nitrogen rejection to the atmosphere. Throughout this step as before, there is continuous air flow into the system and product flow out.

The process of step 2 may be described as simultaneously terminating the depressurizing of step 1 from the outlet end of the second adsorption bed and continuing depressurizing thereof from the inlet end thereof to the waste outlet while continuing adsorption of the feed gas mixture in the first adsorption bed, discharging the product gas from the product outlet and collecting product gas in the segregated storage adsorption bed.

Step No. 3 Valve Af remains open as does Ar, Rp and Hp. Cp now opens allowing product quality oxygen rich gas to flow through Bed C and out valve Cw in a direction reverse to air separation. In addition, part of the product quality gas available at the top end of bed B flows through valve Hb and valve Cp through bed C and out valve Cw to the atmosphere. In this step bed A remains on adsorption, separating air. Product quality gas is withdrawn as product. Product quality oxygen rich gas is taken from the adsorbing bed A and also some from bed B to purge the nitrogen loaded bed C in reverse direction, to reject unwanted impurity to the atmosphere. Throughout this step as before, there is continuous air flow into the system and product flow out.

The process of step 3 may be described as simultaneously continuing to discharge product gas from the product outlet and diverting product gas from the outlet of the first adsorption bed and from the product gas collected in the segregated storage adsorption bed to the outlet end of the second adsorption bed, passing said diverted product gas through the adsorption bed thereof to purge waste gas from the bed to the waste outlet.

Step No. 4 Valve Af remains open as does Ar, Rp and Hp. Valves Cp and Cw close. Product quality oxygen rich gas passes through regulator Rr through Hb resulting in low purity oxygen passing from the bottom of bed B, out valve Bc, which is now open, and into the bottom, or feed air end of bed C. In this step bed A remains on adsorption separating air. Product quality gas is withdrawn as product. Bed B has pressure equalized with bed C, to begin the necessary repressurization of bed C. Bed B has been reverse purged with product quality gas to reject the impurity at its bottom end introduced in step 1. This impurity was introduced at the feed air end of bed C during pressure equalization in this step (4) so as to have minimal effect on the subsequent air separation capacity of bed C. The minimal effect is due to the use of treated air which has less nitrogen content than untreated air. In effect bed B was reverse purged with product quality gas while pressure equalizing with bed C.

The process of step 4 may be described as simultaneously continuing to discharge product gas from the product outlet, terminating the flow of diverted product gas to the second adsorption bed, terminating the discharge of purge gas from the waste outlet, and equalizing the pressures of the segregated storage adsorption bed and the second adsorption bed by passing gas collected in the segregated storage adsorption bed in step number 1 by the partial depressurizing of the second adsorption bed from the second inlet-outlet pipe of the segregated storage adsorption bed to the gas inlet of the second adsorption bed while passing product gas into the first inlet-outlet pipe of the segregated storage adsorption bed, thereby initiating repressurization of the second adsorption bed with a gas of greater product quality than the feed gaseous mixture.

Step No. 5 Valves Af, Ar, Rp, Hp, and Rr remain open. Valve Bc closes and Cp opens allowing product quality gas to enter the top of bed C. Valve Hb closes isolating bed B. In this step bed A remains on adsorption separating air. Product quality gas is withdrawn as product. Bed C is pressurized with product quality gas in preparation for the beginning of its adsorption step.
Bed B is isolated, waiting to accept and store depressurization gas from bed A on the next step.

The process of step 5 may be described as simultaneously terminating the initial repressurization of step 4, isolating the segregated storage adsorption bed, and completely repressurizing the second adsorption bed with product gas diverted from the outlet of the first adsorption bed whereby the second adsorption bed is prepared for the fractionation of at least one component from a gaseous mixture by selective adsorption, while continuing to discharge product gas from the product outlet.

Steps 6 through 10 The next five steps are identical to steps 1 through 5 except bed C now separates air while bed A is regenerated by depressurization and reverse purge. Bed B serves the same function as it did during steps 1 through 5, When all 10 steps are complete, the process has come one full circle and starts again at step 1. Throughout all 10 steps there is continuous air flow into the system and product quality oxygen flow out of the system.

Steps 6 through 10 are consecutively repeating steps 1 through 5 reversing the functions of the first adsorption bed and the second adsorption bed, wherein the gaseous mixture to be fractionated is introduced into and product gas is discharged from the second adsorption bed and the first adsorption bed is depressurized, purged and pressurized for the following sequence.

In accordance with the present invention the process may be initiated at any one of the designated steps and thereafter follow the sequentially numbered steps. Thus, for example, in the embodiment described above, the process may be initiated at step No. 4 and continue consecutively through steps 5–10 and then 1–3 to complete one full circle.

Figure 3:
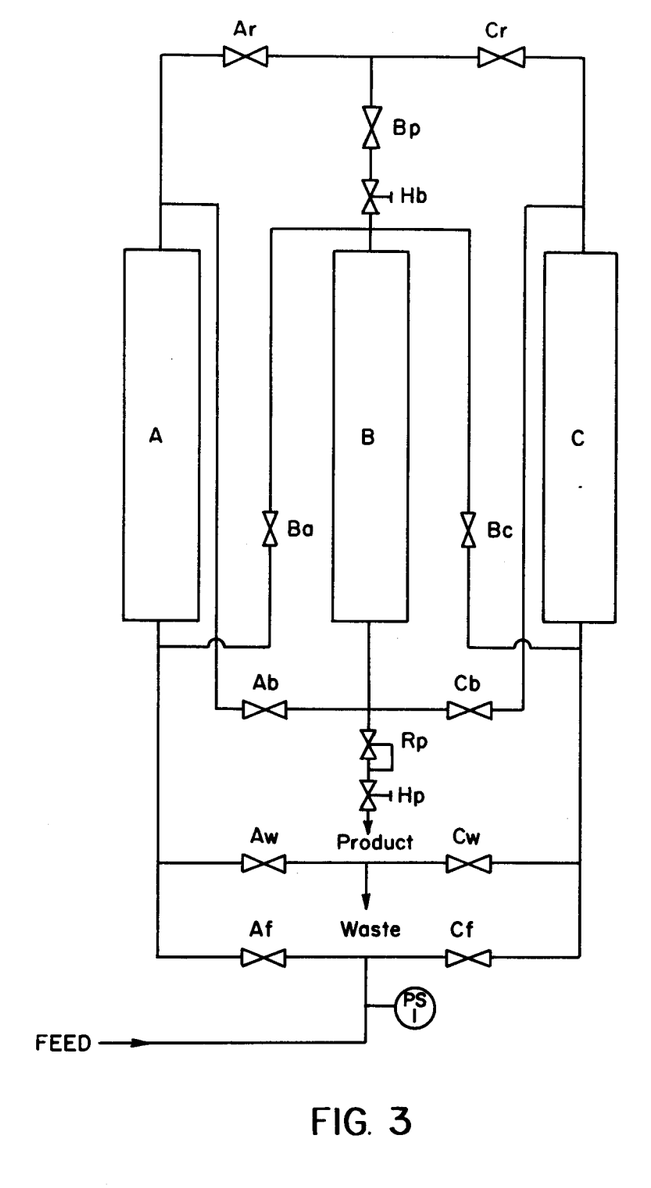
FIG. 3 is a schematic diagram of a low pressure product delivery embodiment.
Figure 4:
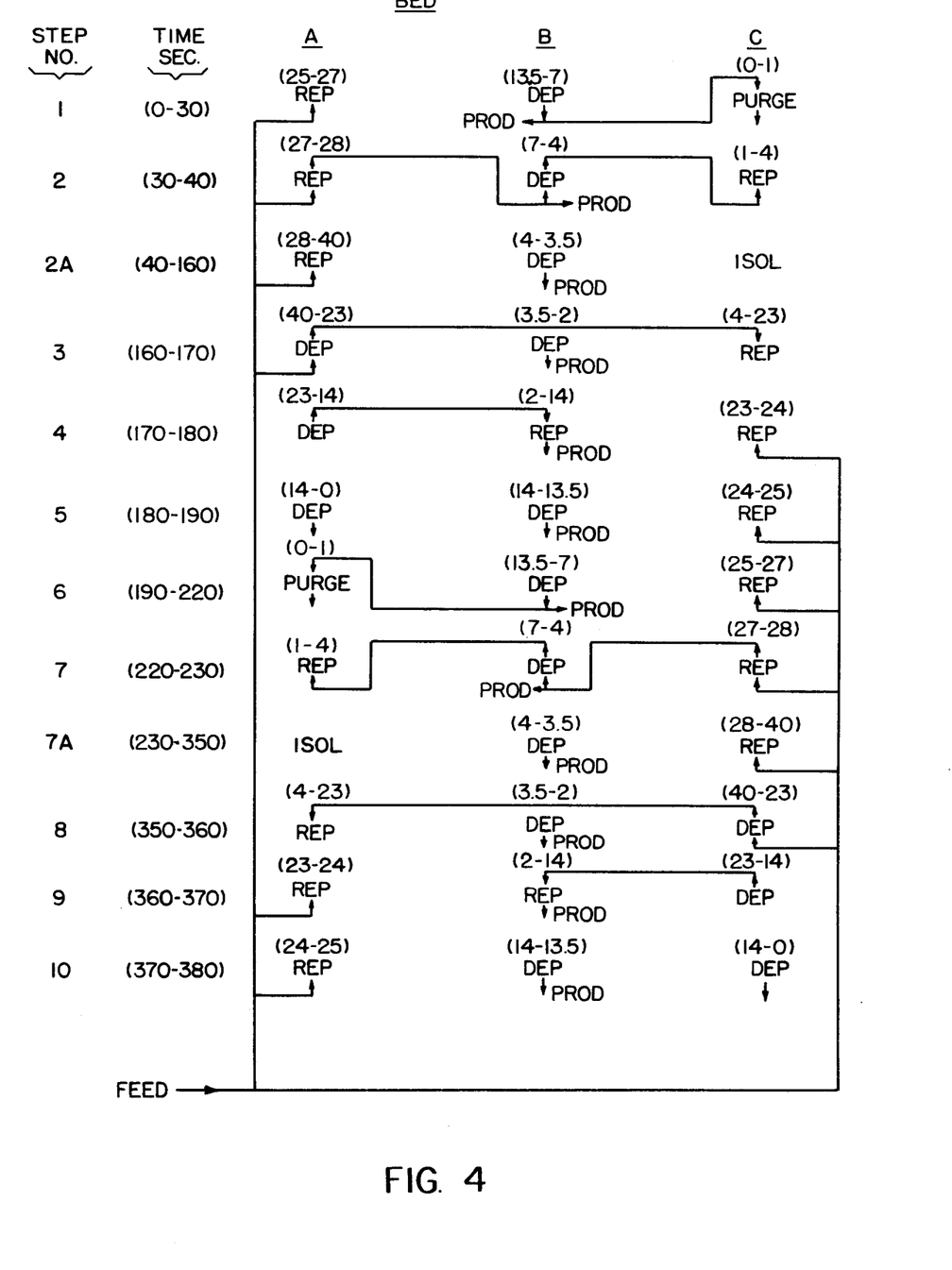
FIG. 4 is a cycle sequence chart for a low pressure product delivery embodiment.

PROCESS STEPS FOR LOW PRESSURE PRODUCT DELIVERY EMBODIMENT OF FIGS. 3 AND 4:

Step No. 1 Valve Af is open introducing feed air into bed A and partially repressurizing bed A. Bed B, (segregated storage adsorber) is depressurizing through regulator Rp and throttle valve Hp to supply oxygen rich product gas. Also, it is depressurizing to reverse purge bed C through valve Cb and reject unwanted nitrogen to the atmosphere through valve Cw. In this step continuous air flow has been maintained through valve Af into bed A. Product quality gas has been delivered as product at low pressure. Bed C has been reverse purged with product quality gas in preparation for air separation.

The process of step 1 may be described as simultaneously introducing the gaseous mixture into the gas inlet of the first adsorption bed from the feed gas stream to repressurize the first adsorption bed, releasing product gas from the second inlet-outlet of the segregated storage adsorption bed to depressurize the segregated storage adsorption bed and discharging part of the product gas from the product outlet while passing product gas into the gas outlet end of the second adsorption bed to reverse purge said bed, the purged gas from said bed being removed at the waste outlet.

Step No. 2 Valve Af remains open. Valve Ab opens allowing product flow through Rp and Hp. Valves Cw and Cb close. Valve Bc opens allowing product quality gas to reverse purge unwanted nitrogen impurity out of bed B into the feed air end of bed C. In this step continuous feed and product flow have been maintained and bed B has been purged of unwanted nitrogen which has been introduced at the feed end of bed C where it has minimal effect on air separation capacity, while also partially repressurizing bed C. This is in effect, an intermediate pressure level isobaric adsorption stroke.

The process of step 2 may be described as simultaneously terminating the reverse purge and the removal of purged waste gas from the second adsorption bed of step 1, continuing to introduce the gaseous mixture into the inlet of the first adsorption bed, allowing the gaseous mixture to pass through the first adsorption bed, releasing product gas from the outlet of the first adsorption bed and discharging product gas from the product outlet; and simultaneously diverting product gas from the outlet of the first adsorption bed to the second inlet-outlet of the segregated storage adsorption bed whereby the segregated storage adsorption bed is reverse purged with product gas, the gas purged from the segregated storage adsorption bed passing to the second adsorption bed through the gas inlet thereof to partially repressurize the second adsorption bed at its feed end.

Step No. 2A Valve Af remains open allowing air to repressurize bed A to the set point of electrical pressure switch Ps-1. Valve Ab is closed. Valve Bc is closed. Regulator Rp and hand valve Hp deliver product quality gas strictly from the segregated storage tank. In this step A is pressurized to the optimum pressure level for this cycle. Bed B delivers product quality gas until bed A is repressurized. Bed C is isolated, awaiting further pressurization.

The process of step 2A may be described as simultaneously terminating the delivery of product gas from the first adsorption bed while continuing to introduce the gaseous mixture into the first adsorption bed to repressurize said bed to the desired pressure, isolating the second adsorption bed and delivering product gas from the segregated storage adsorption bed at low pressure to the product outlet whereby the depressurization of the segregated storage adsorption bed continues and product gas continues to be discharged.

Step No. 3 After electrical pressure switch Ps-1 has functioned at its set point Bed A depressurizes into bed C through Ar and Cr. Valve Af is still open introducing air to bed A even though bed A pressure is decreasing. Bed B continues to supply product quality gas independent of beds A and C. In this step bed A has conserved oxygen and helped repressurize bed C and continual feed flow has been maintained and delivered to the bed at the highest pressure level, bed A.

The process of step 3 may be described as simultaneously continuing to deliver product gas from the segregated storage adsorption bed at low pressure to the product outlet and further reducing the pressure of the segregated storage adsorption bed and continuing to introduce the gaseous mixture into the first adsorption bed, passing gas from the gas outlet of the first adsorption bed to the gas outlet of the second adsorption bed whereby the second adsorption bed is repressurized while the pressure of the first adsorption bed is reduced.

Step No. 4 Valve Cf is now opened introducing air into bed C. Valve Af is closed. Valve Ar and Bp are opened allowing nitrogen rich gas to purge the valve head and piping and enter the top of bed B through throttle valve Hb. Meanwhile bed B continues to deliver product quality oxygen from the opposite end of the bed through regulator Rp and throttle valve Hp. In this step bed C is now being pressurized with air. Bed A is depressurizing in preparation for its waste rejection step. It has depressurized in such a way as to get complete bed utilization and purge the vessel head and piping with nitrogen rich gas. The oxygen rich gas it displaced is stored in bed B. Bed B continues to deliver product quality gas from the other end of bed B. This is a true segregation effect.

The process of step 4 may be described as simultaneously discontinuing the introduction of gaseous mixture into the first adsorption bed, terminating the flow of gas from the first adsorption bed to the second adsorption bed, introducing the gaseous mixture into the gas inlet of the second adsorption bed to continue the pressurization of the bed, passing gas from the gas outlet of the first adsorption bed to the first inlet-outlet pipe of the segregated storage adsorption bed and into said bed whereby the first adsorption bed is partially depressurized and the segregated adsorption bed is repressurized, releasing product gas from the second inlet-outlet end of the segregated storage adsorption bed and discharging the product gas from the product outlet.

Step No. 5 Valve Cf remains open. Bed B continues to deliver product quality gas through Rp and Hp. Valve Aw opens, depressurizing bed A to the atmosphere in a reverse direction to feed air flow. In this step bed C continues to be repressurized with air. Bed A has depressurized to the atmosphere in a reverse direction to feed flow as part of its waste rejection step. Bed B continues to deliver low pressure gas as product.

The product of step 5 may be described as simultaneously terminating the flow of gas from the first adsorption bed to the segregated storage adsorption bed, continuing introducing gaseous mixture into the second adsorption bed to continue pressurization of the bed, continuing releasing product gas from the second inlet-outlet of the segregated storage adsorption bed whereby the segregated storage adsorption bed begins depressurization, and discharging product gas from the product outlet.

Steps 6 – 10 The next five steps are identical to steps 1 – 5 except beds A and C reverse roles while bed B repeats the same function. When all ten steps are complete, the process has come a full circle and begins again at step one. Throughout all ten steps there is continuous air flow into the system and product quality oxygen flowing out of the system.

Steps 6 through 10 are consecutively repeating steps 1 through 5 reversing the functions of the first adsorption bed and the second adsorption bed, wherein the gaseous mixture to be fractionated is introduced into and product gas is discharged from the second adsorption bed while the first adsorption bed is purged, isolated and repressurized and the segregated storage adsorption bed provides a reservoir for the continuous discharge of product gas from the product outlet.

This process may be initiated at any one of the designated steps and thereafter follow the sequentially numbered steps.

Figure 5:
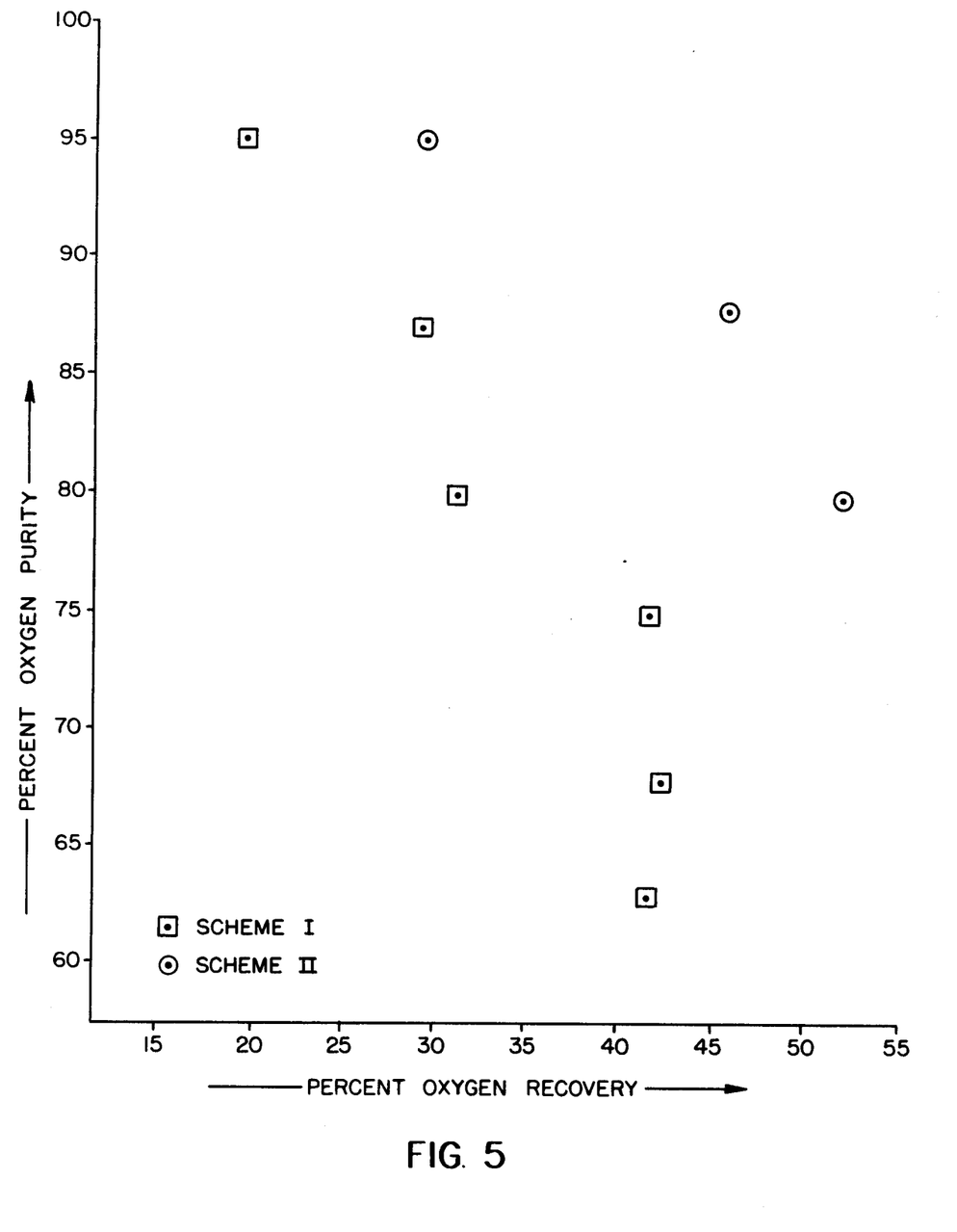
FIG. 5 is a graphical representation showing a plot of the percent oxygen recovery to the percent oxygen purity for a high pressure delivery system and a low pressure delivery system.

Referring to FIG. 5, the graph represents the performance levels of schemes I and II as a function of oxygen purity and recovery when the processes are used in the air fractionation or separation made. Scheme I represents the high pressure product delivery cycle and is designated in the graph by squares. Scheme II represents the low pressure product delivery cycle and is designated in the graph by circles. Data points are included for operation with pressure equalization solely at the product end of the adsorber for both schemes.

EXAMPLES

The following examples are intended to further define, describe and compare exemplary processes for this invention and to illustrate various preferred embodiments.

All testing was accomplished with apparatus suitable for testing all cycles and is essentially illustrated in FIGS. 1 and 3. Each of the two adsorbent beds contained about 140 pounds of type 5A molecular sieve material. The segregated storage tank contained 70 pounds of the same material. A summary of operating characteristics of each of the cycles tested is shown in Table 1 below:

TABLE 1

| Test | Oxygen Ave. Purity (%) | Rec. % | Amb. Temp. (°C) | Bed Length (Meters) | Storage Tank | Equal. Prod. | Equal. Feed | Product Press. (psig.)* |
|---|---|---|---|---|---|---|---|---|
| 1 | 82 | 13.7 | 7 | 1.22 | empty | x | | 40 |
| 2 | 92 | 15.2 | 8 | 2.44 | empty | x | | 40 |
| 3 | 87 | 24.2 | 5 | 2.44 | full | x | | 40 |
| 4 | 87 | 25.9 | 9 | 2.44 | full | x | | 40 |
| 4 | 88 | 29.3 | 7 | 2.44 | full | | x | 40 |
| 5 | 63 | 41.4 | 13 | 2.44 | full | | x | 40 |
| 6 | 68 | 42.2 | 6 | 2.44 | full | | x | 40 |
| 7 | 75 | 41.4 | 9 | 2.44 | full | | x | 40 |
| 8 | 80 | 31.2 | 3 | 2.44 | full | | x | 40 |
| 9 | 87 | 29.0 | 6 | 2.44 | full | | x | 40 |
| 10 | 95 | 18.9 | 9 | 2.44 | full | | x | 40 |
| 11 | 88 | 45.5 | 10 | 2.44 | full | | x | 2 |
| 12 | 80 | 51.9 | 10 | 2.44 | full | | x | 2 |
| 13 | 95 | 29.2 | 10 | 2.44 | full | | x | 2 |

*1 p.s.i.g. = 0.070307 kg/cm²

In accordance with the stated objects there has been demonstrated a process for providing a continuous, uninterrupted flow of product gas from adsorbent beds which have selectively separated gases in a continuously flowing feed gas stream. Low purity product gases have been used for repressurization of regenerated adsorbent beds without sacrificing the quality of the product gas and actually improving recovery.

While the invention has been described with respect to preferred embodiments, it will be apparent that certain modifications and changes can be made without departing from the spirit and scope of the invention and therefore, it is intended that the foregoing disclosure be limited only by the claims appended hereto.

What is claimed is:

1. In a pressure swing process for fractionating at least one component from a gaseous mixture by selective adsorption in each of at least two adsorption zones by sequentially passing the gaseous mixture from a feed stream through a first adsorption zone until low purity product gas is obtained while simultaneously purging and then pressurizing a second adsorption zone and then through the second adsorption zone until low purity product gas is obtained while simultaneously purging and then pressurizing the first adsorption zone, the improvement comprising selectively collecting product quality gas and low purity gas which is not of product quality in a segregated storage adsorption zone; selectively passing the product quality gas collected in the segregated storage adsorption zone from one end of the segregated storage adsorption zone as countercurrent purge gas to at least contribute to the purge gas used to remove components adsorbed in the beds of the adsorption zones; and selectively diverting the low purity gas collected in the segregated storage adsorption zone from the other end of the segregated storage adsorption zone as repressurizing gas to an adsorption zone after said adsorption zone has been purged with a countercurrent flow of purge gas at least part of which was contributed by gas from the segregated storage adsorption zone to at least contribute to the repressurization of that particular adsorption zone, said segregated storage adsorption zone never being exposed directly to the feed gas stream during the fractionation cycles.

2. The process of claim 1 further comprising selectively passing the product quality gas collected in the segregated storage adsorption zone as product gas to contribute to a continuous flow of product gas when the adsorption zones do not provide product gas.

3. The pressure swing process of claim 1 further comprising passing the gaseous mixture through a plurality of first adsorption zones.

4. The pressure swing process of claim 1 further comprising passing the gaseous mixture through a plurality of second adsorption zones.

5. The pressure swing process of claim 1 further comprising collecting product gas in a plurality of segregated storage adsorption zones.

6. A process for continuously fractionating at least one component from a gaseous mixture by selective adsorption in each of at least two adsorption zones in a high pressure product cycle comprising the steps of:
 a. providing a first adsorption bed having a gas inlet and a gas outlet, at least one additional adsorption bed having a gas inlet and a gas outlet, the gas inlets of said first and at least one additional adsorption beds being connected to a feed gas stream, at least one segregated storage adsorption bed having two inlet-outlet pipes the at least one segregated storage adsorption bed being isolated from direct communication with the feed gas stream, the first inlet-outlet communicating with the gas inlets and gas outlets of said first and at least one additional adsorption beds and the second inlet-outlet communicating with the gas outlet of said first and at least one additional adsorption beds and a product outlet, the product outlet also communicating with the outlet of the first and at least one additional beds, a waste outlet communicating with the inlet of said first and at least one additional adsorption beds, and associated valves to isolate each of said adsorption beds;
 b. simultaneously introducing the gaseous mixture into the gas inlet of the first adsorption bed from the feed gas stream, allowing the gaseous mixture to pass through the first adsorption bed, releasing product gas from the outlet of the first adsorption bed, and discharging the product gas from the product outlet;
 c. simultaneously with step (b) collecting product gas in the segregated storage adsorption bed through one of the inlet-outlet pipes thereof while partially depressurizing the at least one additional adsorption bed from the outlet thereof into the other inlet-outlet pipe of the segregated storage adsorption bed, until the gas flowing from the at least one additional adsorption bed into the segregated storage adsorption bed is depleted of any product value;
 d. terminating the depressurizing of step (c) from the outlet end of the at least one additional adsorption bed and then continuing depressurizing thereof from the inlet end thereof to the waste outlet while continuing adsorption of the feed gas mixture in the first adsorption bed, discharging the product gas from the product outlet and collecting product gas in the segregated storage adsorption bed;
 e. continuing to discharge product gas from the product outlet and diverting product gas from the outlet of the first adsorption bed and from the product gas collected in the segregated storage adsorption bed to the outlet end of the at least one additional adsorption bed, passing said diverted product gas through the adsorption bed thereof to purge waste gas from the bed to the waste outlet;
 f. continuing to discharge product gas from the product outlet, terminating the flow of diverted product gas to the at least one additional adsorption bed, terminating the discharge of purge gas from the waste outlet, and equalizing the pressures of the segregated storage adsorption bed and the at least one additional adsorption bed by passing gas collected in the segregated storage adsorption bed in step (c) by the partial depressurizing of the at least on additional adsorption bed from the one inlet-outlet pipe of the segregated storage adsorption bed to the gas inlet of the at least one additional adsorption bed while passing product gas into the other inlet-outlet pipe of the segregated storage adsorption bed, thereby initiating repressurization of the at least one additional adsorption bed with a gas of greater product quality than the feed gaseous mixture;
 g. terminating the initial repressurization of step (f), isolating the segregated storage adsorption bed, and completely repressurizing the at least one additional adsorption bed with product gas diverted from the outlet of the first adsorption bed whereby the at least one additional adsorption bed is prepared for the fractionation of at least one component from a gaseous mixture by selective adsorption, while continuing to discharge product gas from the product outlet; and
 h. thereafter consecutively repeating steps (b) through (g) reversing the functions of the first adsorption bed and the at least one additional bed, wherein the gaseous mixture to be fractionated is introduced into and product gas is discharged from the at least one additional adsorption bed and the first adsorption bed is depressurized, purged and pressurized for repeating steps (a) through (h).

7. The process of claim 6 wherein the gaseous mixture is air, the adsorbent beds comprise a zeolite, the component fractionated from the gaseous mixture is nitrogen, and the product gas is enriched in oxygen.

8. The process of claim 6 wherein the product gas is available at about adsorption bed pressure.

9. The process of claim 8 wherein adsorption bed pressure is about 40 p.s.i.g.

10. A process for continuously fractionating at least one component from a gaseous mixture by selective adsorption in each of at least two adsorption zones in a low pressure delivery product gas cycle comprising the steps of:
 a. providing a first adsorption bed having a gas inlet and a gas outlet, at least one additional adsorption bed having a gas inlet and a gas outlet, the gas inlets of said first and at least one additional adsorption beds being connected to a feed gas stream, at least one segregated storage adsorption bed having two inlet-outlet pipes the at least one segregated storage adsorption bed being isolated from direct communication with the feed gas stream, the first inlet-outlet communicating with the gas inlets and gas outlets of said first and at least one additional adsorption beds and the second inlet-outlet communicating with the gas outlets of said first and at least one additional adsorption beds and a product outlet, the product outlet also communicating with the outlet of the first and at least one additional beds, a waste outlet communicating with the inlet and outlet of said first and at least one additional adsorption beds, and associated valves to isolate each of said adsorption beds;

b. simultaneously introducing the gaseous mixture into the gas inlet of the first adsorption bed from the feed gas stream of repressurize the first adsorption bed, releasing product gas from the second inlet-outlet of the segregated storage adsorption bed after the segregated storage adsorption bed has product gas adsorbed therein, to depressurize the segregated storage adsorption bed and discharging part of the product gas from the product outlet while passing product gas into the gas outlet end of the at least one additional adsorption bed to reverse purge said bed, the purged gas from said bed being removed at the waste outlet;

c. terminating the reverse purge and the removal of purged waste gas from the at least one additional adsorption bed of step (b), continuing to introduce the gaseous mixture into the inlet of the first adsorption bed, allowing the gaseous mixture to pass through the first adsorption bed, releasing product gas from the outlet of the first adsorption bed and discharging product gas from the product outlet;

d. simultaneously with step (c) diverting product gas from the outlet of the first adsorption bed to the second inlet-outlet of the segregated storage adsorption bed whereby the segregated storage adsorption bed is reverse purged with product gas, the gas purged from the segregated storage adsorption bed passing to the at least one additional adsorption bed through the gas inlet thereof to partially repressurize the at least one additional adsorption bed;

e. terminating the delivery of product gas from the first adsorption bed while continuing to introduce the gaseous mixture into the first adsorption bed to repressurize said bed to the desired pressure, isolating the at least one additional adsorption bed and delivering product gas from the segregated storage adsorption bed at low pressure to the product outlet whereby the depressurization of the segregated storage adsorption bed continues and product gas continues to be discharged;

f. continuing to deliver product gas from the segregated storage adsorption bed at low pressure to the product outlet and further reducing the pressure of the segregated storage adsorption bed, and continuing to introduce the gaseous mixture into the first adsorption bed, passing gas from the gas outlet of the first adsorption bed to the gas outlet of the at least one additional adsorption bed whereby the at least one additional adsorption bed is repressurized while the pressure of the first adsorption bed is reduced;

g. discontinuing the introduction of gaseous mixture into the first adsorption bed, terminating the flow of gas from the first adsorption bed to the at least one additional adsorption bed, introducing the gaseous mixture into the gas inlet of the at least one additional adsorption bed to continue the pressurization of the bed, passing gas from the gas outlet of the first adsorption bed to the first inlet-outlet pipe of the segregated storage adsorption bed and into said bed whereby the first adsorption bed is partially depressurized and the segregated adsorption bed is repressurized, releasing product gas from the second inlet-outlet end of the segregated storage adsorption bed and discharging the product gas from the product outlet;

h. terminating the flow of gas from the first adsorption bed to the segregated storage adsorption bed, continuing introducing gaseous mixture into the at least one additional adsorption bed to continue pressurization of the bed, continuing releasing product gas from the second inlet-outlet of the segregated storage adsorption bed whereby the segregated storage adsorption bed begins depressurization, and discharging product gas from the product outlet; and i. thereafter consecutively repeating steps (b) through (h) reversing the functions of the first adsorption bed and the at least one additional bed, wherein the gaseous mixture to be fractionated is introduced into and product gas is discharged from the at least one additional adsorption bed while the first adsorption bed is purged, isolated and repressurized, and the segregated storage adsorption bed provides a reservoir for the continuous discharge of product gas from the product outlet.

11. The process of claim 10 wherein the gaseous mixture is air, the adsorbent bed comprise a zeolite, the component fractionated is nitrogen, and the product gas is enriched in oxygen.

12. The process of claim 10 wherein the product gas is available at a pressure less than about 2 p.s.i.g.

* * * * *